United States Patent
Yoshioka et al.

(10) Patent No.: US 6,696,982 B2
(45) Date of Patent: *Feb. 24, 2004

(54) VEHICLE TERMINAL APPARATUS AND AN INFORMATION TRANSMITTING SYSTEM

(75) Inventors: Kenji Yoshioka, Yokohama (JP); Takumi Ajima, Zama (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,896

(22) Filed: Apr. 3, 2000

(65) Prior Publication Data

US 2002/0093434 A1 Jul. 18, 2002

(30) Foreign Application Priority Data

Apr. 7, 1999 (JP) .......................... 11-100570

(51) Int. Cl.$^7$ ............................................... G08G 1/123
(52) U.S. Cl. ............. 340/988; 340/426.13; 340/426.17; 340/426.19; 340/426.2; 340/539.17; 340/539.1; 455/343.1; 455/345
(58) Field of Search ................................ 340/988, 7.32, 340/7.33, 7.36, 990, 991, 995, 909, 426, 457, 426.19, 539.13, 539.17, 539.1; 455/343, 456, 574, 404, 345, 343.1, 426.2, 404.2, 456.1; 379/35; 342/457; 701/29, 30

(56) References Cited

U.S. PATENT DOCUMENTS

| | | | | |
|---|---|---|---|---|
| 5,095,308 A | * | 3/1992 | Hewitt | ...................... 340/636 |
| 5,376,917 A | * | 12/1994 | Yoshimoto et al. | ......... 340/438 |
| 5,557,254 A | * | 9/1996 | Johnson et al. | ............. 340/426 |
| 5,572,204 A | * | 11/1996 | Timm et al. | ................. 340/988 |
| 5,631,947 A | * | 5/1997 | Wittstein et al. | ....... 379/114.17 |
| 5,848,373 A | * | 12/1998 | DeLorme et al. | ........... 701/200 |
| 5,956,158 A | * | 9/1999 | Pinzarrone et al. | ......... 358/474 |
| 6,028,537 A | * | 2/2000 | Suman et al. | ............... 340/988 |
| 6,140,956 A | * | 10/2000 | Hillman et al. | ............. 701/213 |
| 6,211,581 B1 | * | 4/2001 | Farrant | ....................... 307/117 |
| 6,271,748 B1 | * | 8/2001 | Derbyshire et al. | ......... 340/442 |
| 6,518,881 B2 | * | 2/2003 | Monroe | .................... 340/539.1 |

* cited by examiner

*Primary Examiner*—Benjamin C. Lee
(74) *Attorney, Agent, or Firm*—Louis Woo

(57) ABSTRACT

A wireless communication circuit provides wireless communication with a network; and a supply power control circuit controls supplying a power to at least one of said wireless communication circuit and a unit in a vehicle in response to a command signal which is inputted from an operation circuit or through the wireless communication circuit. The power is periodically supplied to a unit in its vehicle or the wireless communication circuit. A control circuit receives data from the unit and stores the data. The data is outputted or transmitted in response a data request. The unit may be a position detection circuit including a GSP receiver. The power is cut off when the unit is not used. Information is transmitted to the vehicle terminal apparatus which stores and displays it in response to a data command or a start-up of the vehicle. A diagnostic function may be provided. The main battery may be checked and the result is transmitted. The position of the vehicle are periodically detected and compared to detect a trouble of the vehicle. The result may be transmitted. An emergency informing function or system may be provided. The information transmitting system reads data from a data base and transmits data to a vehicle terminal apparatus.

1 Claim, 15 Drawing Sheets

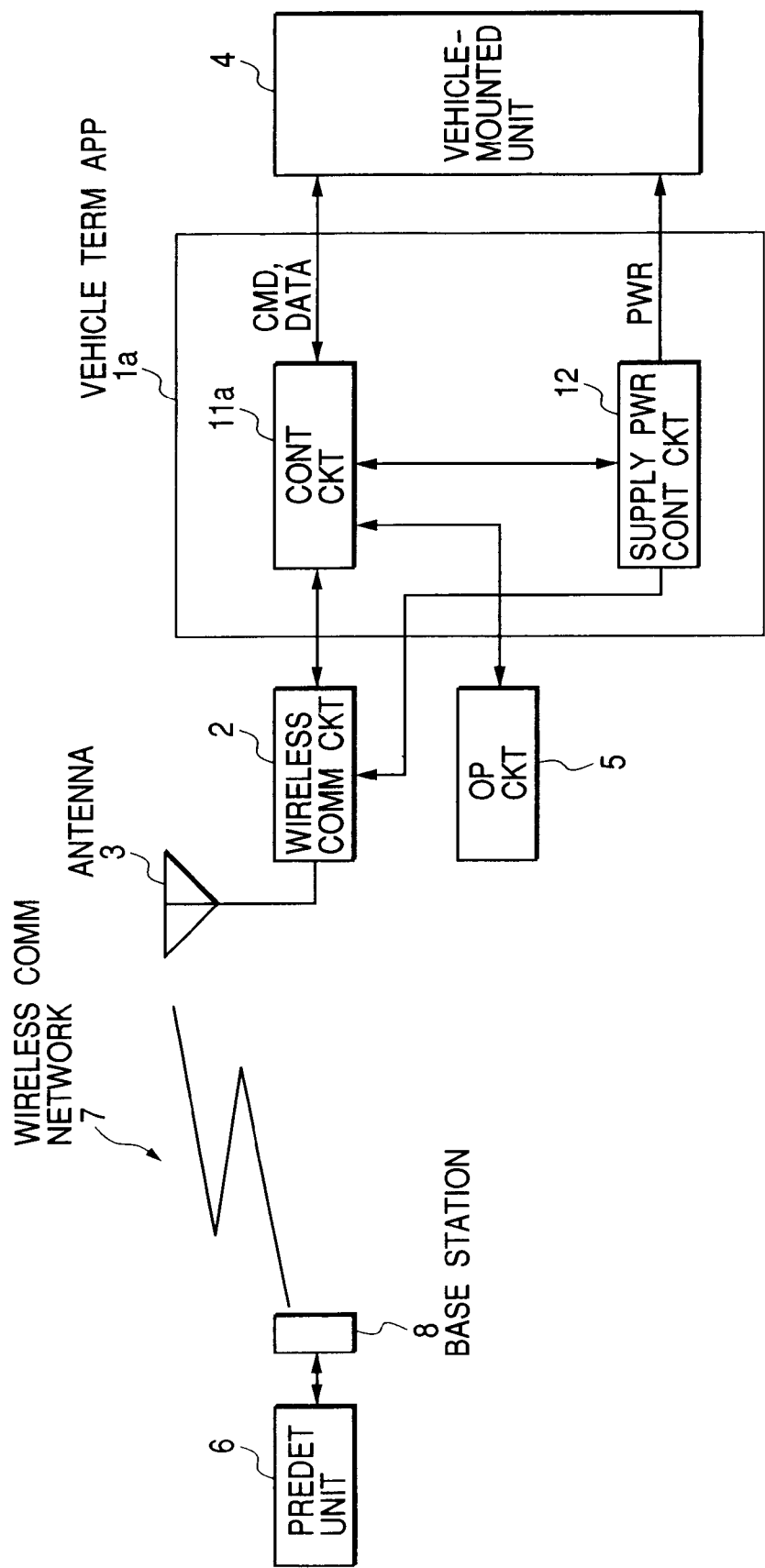

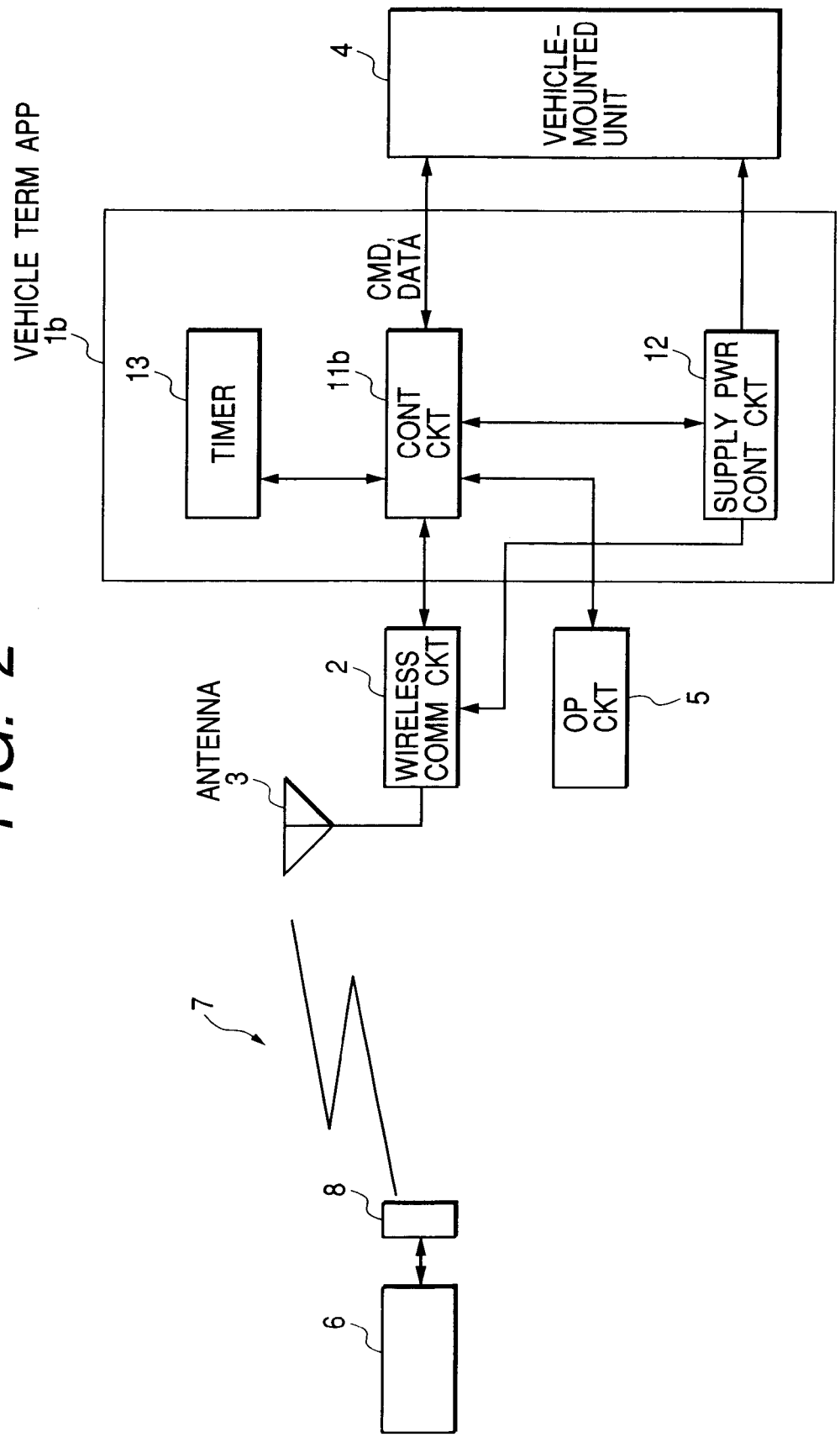

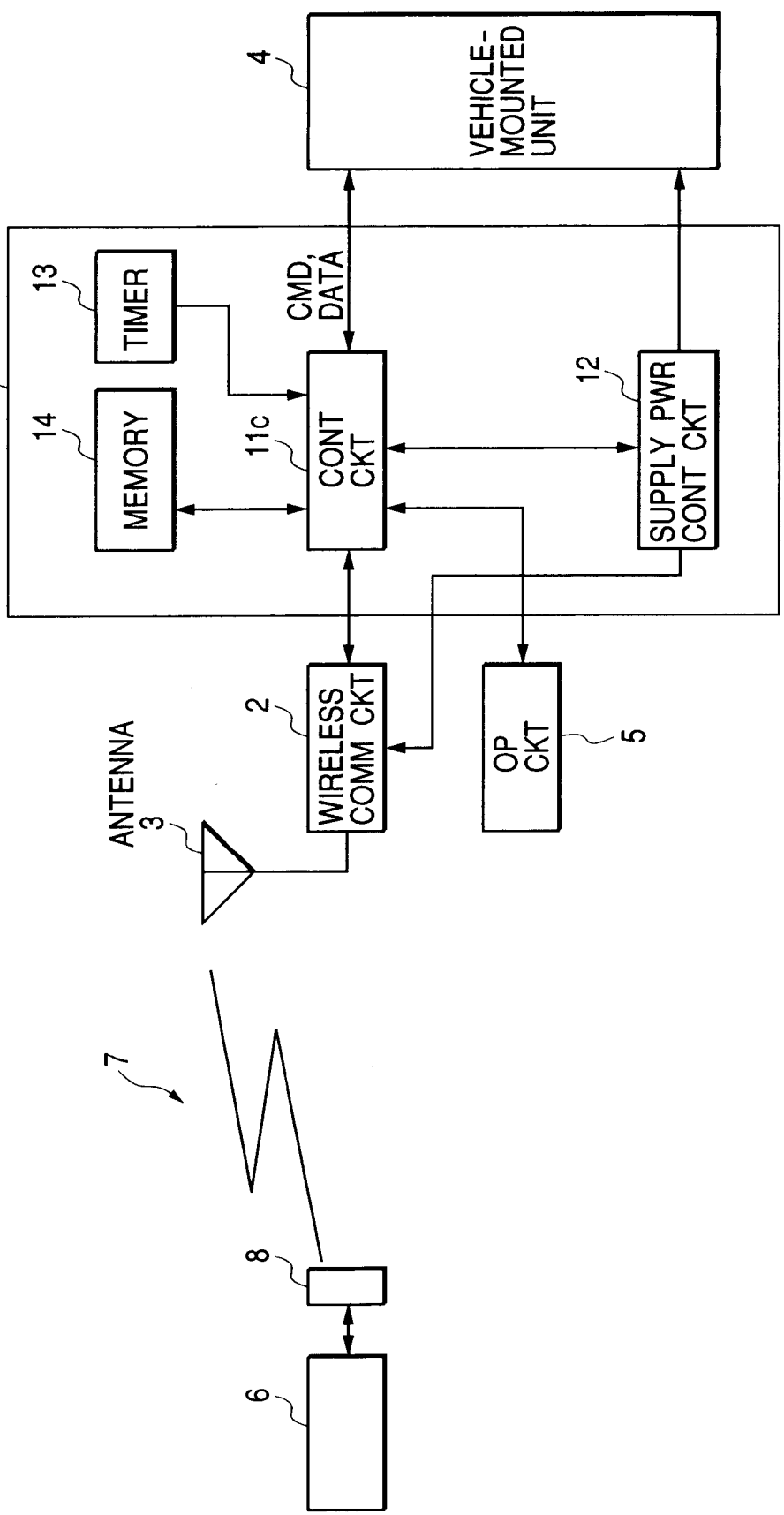

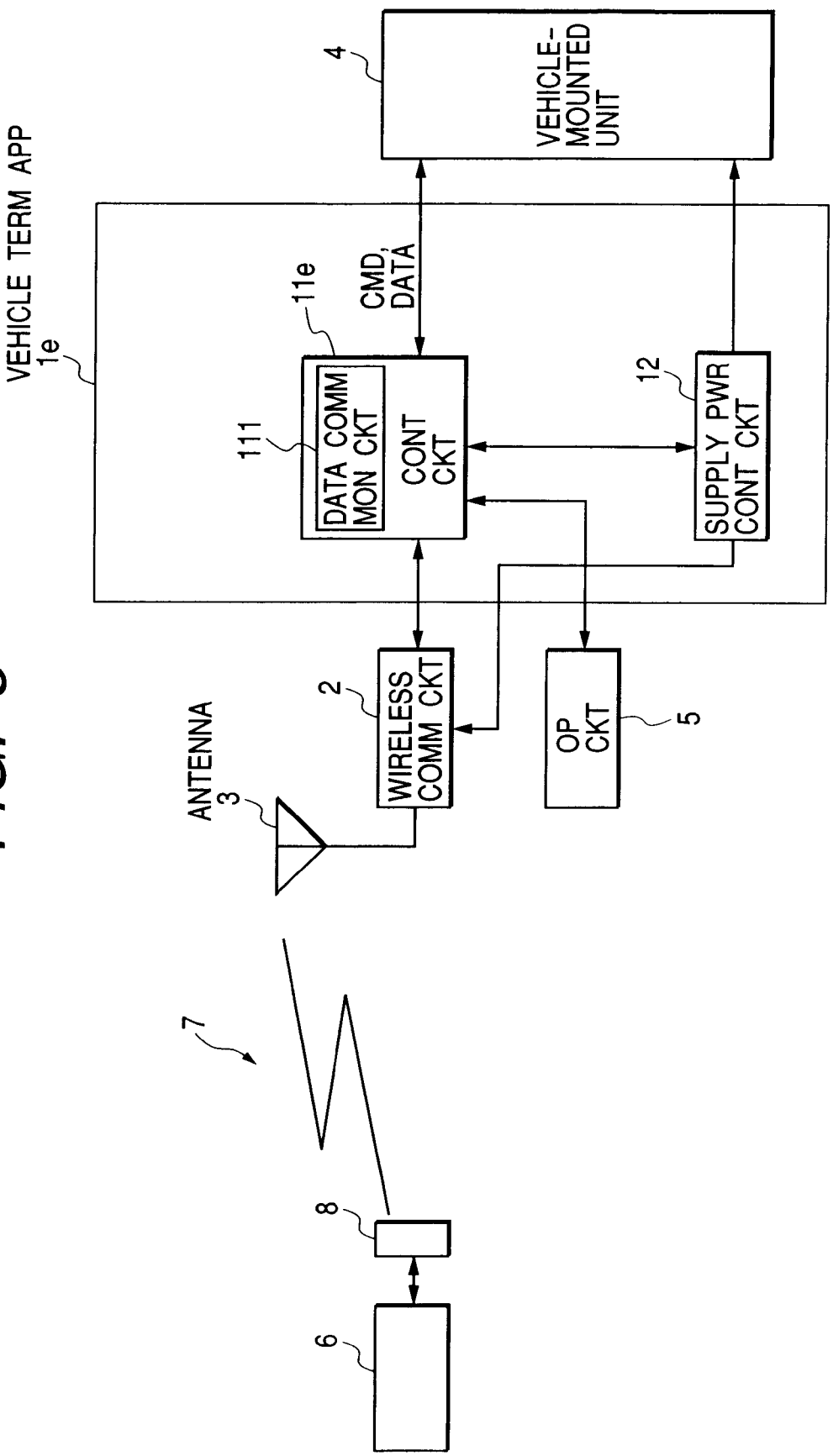

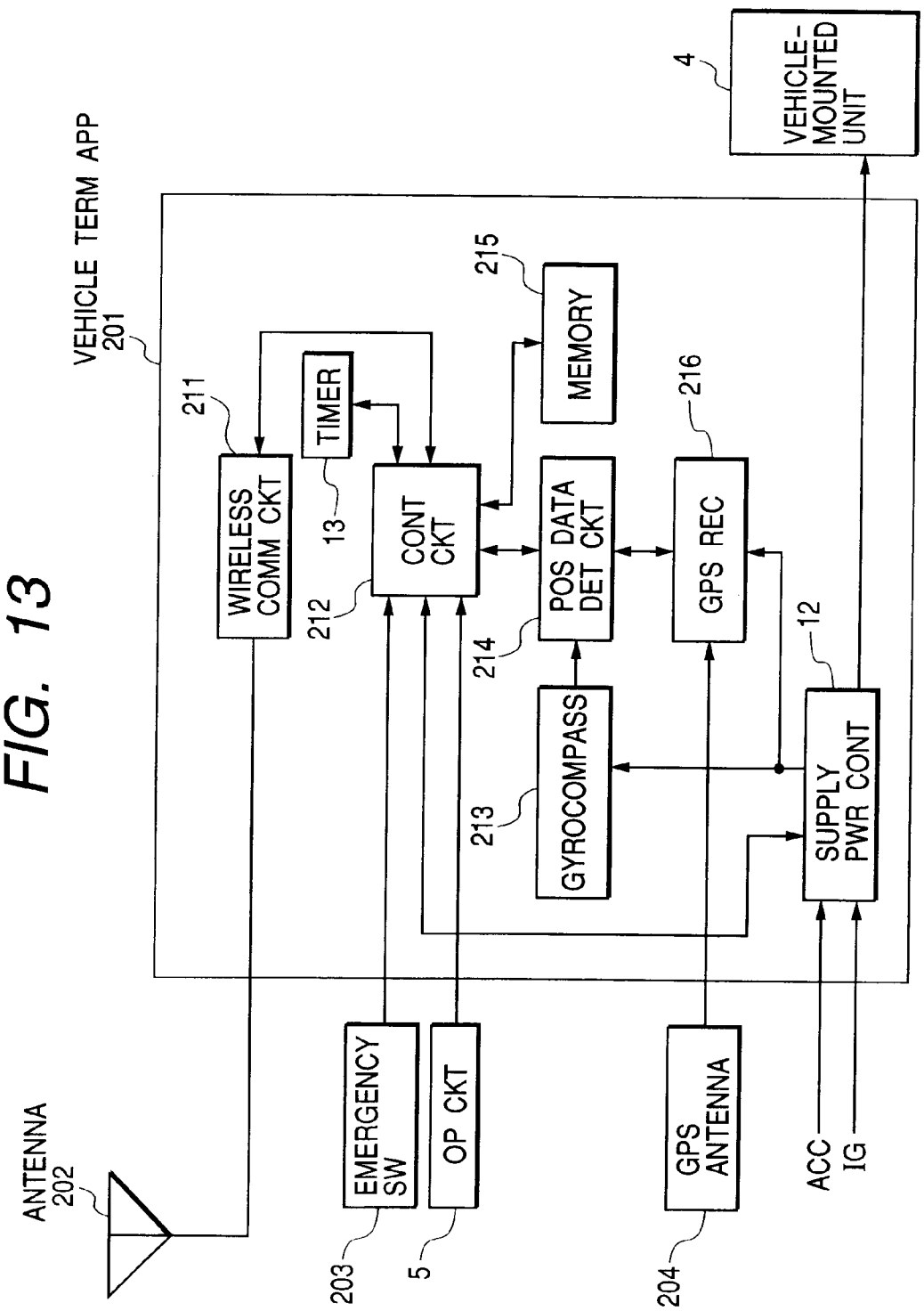

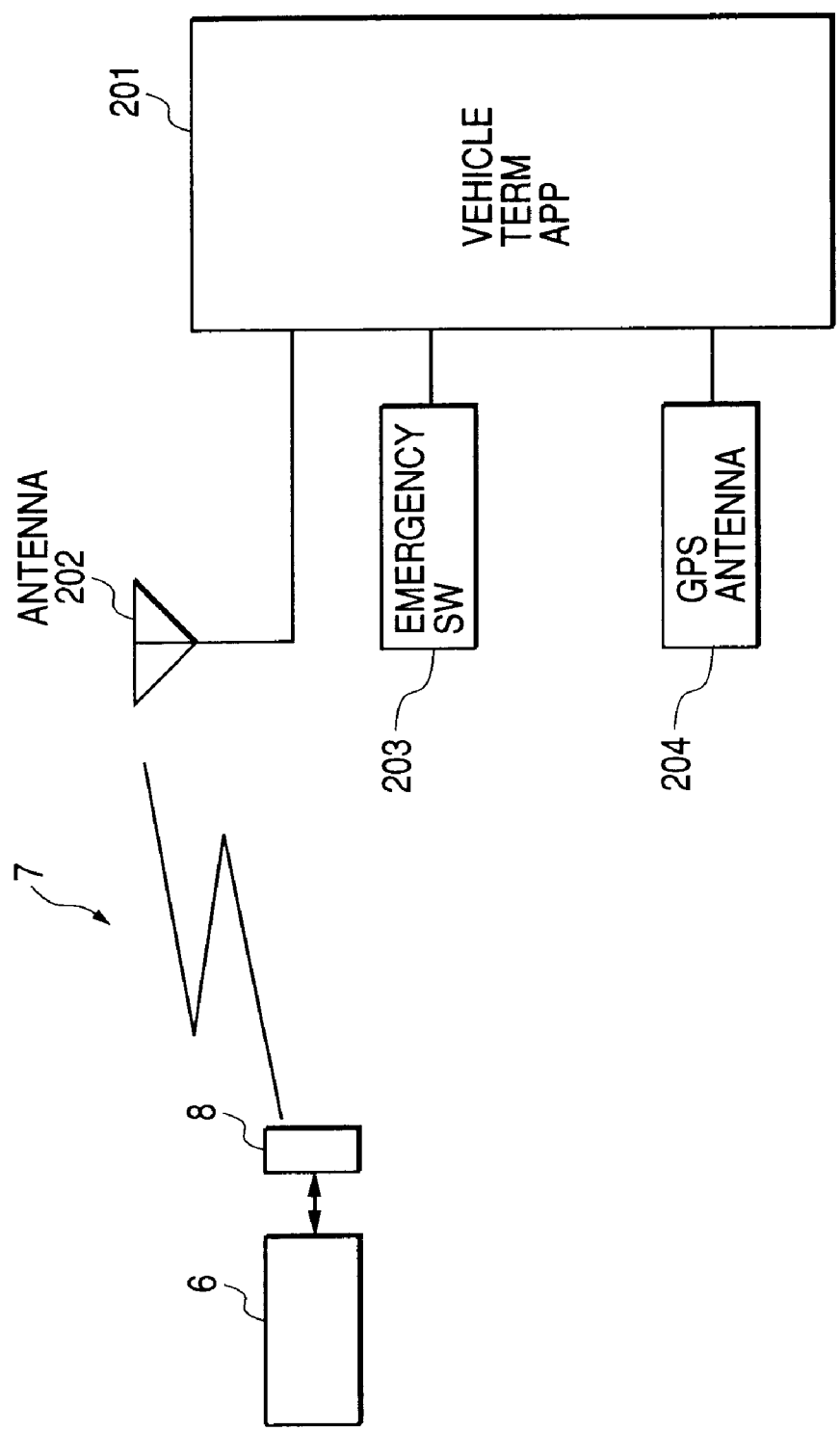

VEHICLE TERMINAL APPARATUS AND AN INFORMATION TRANSMITTING SYSTEM

BACKGROUND OF THE INVENTION

1. Field of the Invention

This invention relates to a vehicle terminal apparatus for a vehicle with a wireless communication function and an information transmitting system including the vehicle terminal for transmitting information between a predetermined station and the vehicle terminal apparatus.

2. Description of the Prior Art

A vehicle terminal apparatus for a vehicle including wireless communication circuit for communicating with a predetermined unit is known.

SUMMARY OF THE INVENTION

The aim of the present invention is to provide a superior vehicle terminal apparatus and a superior information transmitting system.

According to this invention, there is a vehicle terminal apparatus for a vehicle is provided. The vehicle terminal includes: a wireless communication circuit for providing wireless communication with a network; and a supply power control circuit for controlling supplying a power to at least one of the wireless communication circuit and a unit in the vehicle in response to a command signal.

In the vehicle terminal apparatus, the wireless communication circuit receives the command signal from the network and supplies the received command signal to the supply power control circuit when the wireless communication circuit is supplied with the power.

The vehicle terminal apparatus may further includes an operation circuit for generating the command signal in response to operation by a user to supply the command signal to the supply power control circuit.

The vehicle terminal apparatus may further include a control circuit, a timer, and a memory. The supply power control circuit supplies the power periodically in response to the timer. The control circuit responsive to the timer receives data from the unit and stores the data in the memory, the control circuit outputs the data from the memory in response to a data request signal. Moreover, the control circuit transmits the data from the memory with the wireless communication circuit in response to the data request signal. Moreover, a position detection circuit supplied with the power may be further included. The control circuit periodically operates the supply power control circuit to supply the power to the position detection circuit, receives position data from the position detection circuit, and stores the received position data in the memory in response to the timer. The control circuit transmits the data from the memory to a predetermined unit with the wireless communication circuit in response to the data request signal. Moreover, the position detection circuit includes a GPS receiver. The control circuit communicates with the predetermined unit through the network and the wireless communication circuit in response to the data request signal and receives Ephemeris data including orbit data of GPS satellites from the predetermined unit. The control circuit supplies the Ephemeris data to the position detection circuit, receives position data from the position detection circuit, and forwards the position data to the predetermined unit through the network and the wireless communication circuit.

In the vehicle terminal apparatus, the control circuit is further provided, which detects operation conditions of the wireless communication circuit and the unit. The control circuit stops supplying the power to at least one of the wireless communication circuit and the unit of which the detected operation condition is operation using the power supply control circuit in accordance with the detected conditions.

The vehicle terminal apparatus further includes a memory and a control circuit. The control circuit operates the supply power control circuit to supply the power to the unit in response to the command signal, receives data from the unit, and stores the data in the memory. The control circuit transmits the data from the memory through the wireless communication circuit in response to a data request command.

The vehicle terminal apparatus may further include a memory, a data informing circuit supplied with the power, and a start-up condition detection circuit for detecting a start-up condition of the vehicle by a user. The control circuit receives data from the predetermined unit in response to a data receiving command, stores the received data in the memory, and provides the information from the memory to the user with the data informing circuit in response to the start-up condition detection circuit.

The vehicle terminal apparatus may further include a control circuit, a memory and an error detection circuit for detecting an error in the vehicle terminal apparatus and storing data of the detected error in the memory. The control circuit transmits the data of the detected error from the memory to a predetermined unit through the network and the wireless communication circuit when the control circuit receives a data request from the predetermined unit through the network and the wireless communication circuit.

In the vehicle terminal apparatus, the power supply control circuit receives a battery power from a main battery of the vehicle to supply the power. The power supply control circuit includes a voltage detection circuit for detecting a voltage of the battery power and a comparing circuit for comparing the voltage with a reference. The power supply control circuit transmits result of the comparing circuit to a predetermined unit through the wireless communication circuit and the network.

The vehicle terminal apparatus may further include a control circuit, a timer for periodically generating a timing signal, a memory, and a start-up detection circuit for detecting a start-up operation of the vehicle. The control circuit responsive to the timer operates the supply power control circuit to supply power to the unit and supplies a position data requesting command to the unit and then, receives position data from the unit and stores the position data in the memory. The control circuit may further include a position difference detecting circuit for detecting difference from present position data to previous position data in the memory and a comparing circuit for comparing the difference with a reference. The control circuit outputs an alarm signal when the difference exceeds the reference and the start-up detection circuit detect does not detects the start-up operation between the present timing signal and the previous timing signal. Moreover, the control circuit transmits the alarm signal to the predetermined unit in response to a communication request from the predetermined unit.

The vehicle terminal apparatus may further include: a position detecting circuit for detecting a position of the vehicle terminal apparatus in response to the command signal; a data generation circuit including a memory for generating emergency data including at least identification data of the vehicle from the memory, telephone number data of a predetermined unit from the memory, and the position data in response to the command signal; a control circuit for making a call to the predetermined unit through the wireless communication circuit and the network and transmitting emergency data to a called party indicated by the called party data in response to the command signal; a start-up detection circuit for detecting a start-up condition of the vehicle. The control circuit operates the supply power control circuit to stop supplying the power to the position detecting circuit when the start-up detection circuit does not detect the start-up condition.

The vehicle terminal apparatus may further include: a position detecting circuit for detecting a position of the vehicle terminal apparatus in response to an emergency informing command signal; a data generation circuit including a memory for generating emergency data including at least identification data of the vehicle from the memory, telephone number data of a predetermined unit from the memory, and the position data in response to the emergency informing command signal; and a control circuit for making a call to the predetermined unit through the wireless communication circuit and the network and transmitting emergency data to the predetermined unit in response to the emergency informing command signal.

According to this invention, there is provided an information transmitting system including a station and vehicle terminal apparatus, and a wireless communication system. The station includes: a communication circuit; a data base; and a control terminal for reading data. The vehicle terminal apparatus includes: a wireless communication circuit for communicating with the station through the wireless network; a control circuit; a memory; an information providing circuit; and a supply power control circuit for controlling supplying a power to at least one of the wireless communication circuit and a unit in the vehicle in response to a command signal. When the control terminal receives a data search and transmitting command, the control terminal searches data in the data base in accordance with the data search and transmitting command and transmits the searched data to the vehicle terminal. When the control circuit receives the data transmitted through the wireless network and the wireless communication circuit, the control circuit stores the received data in the memory and provides the received data with the information providing circuit to a user of the vehicle terminal in response to an information providing command.

In the information transmitting system, the vehicle terminal apparatus further includes a start-up detection circuit for detecting a start-up condition of the vehicle and generating the information providing command when the start-up condition of the vehicle is detected.

According to this invention, there is provided an (emergency) information transmitting system. The information transmitting system includes a wireless telephone network, a vehicle terminal apparatus and a predetermined unit coupled to the wireless telephone network. The vehicle terminal apparatus for a vehicle includes a wireless communication circuit for providing wireless communication with the wireless telephone network; a position detecting circuit for detecting a position of the emergency informing apparatus in response to an emergency informing command signal; a supply power control circuit for controlling supplying a power to at least one of the wireless communication circuit and the position detection circuit in response to the emergency informing command signal; a data generation circuit including a memory for generating emergency data including at least identification data of the vehicle from the memory, telephone number data of a predetermined unit from the memory, and the position in response to the emergency informing command signal; and a communication circuit for making a call with the telephone number data and transmitting emergency data to the predetermined unit in response to the emergency command signal. The predetermined unit receives and outputs the emergency data from the wireless telephone network.

BRIEF DESCRIPTION OF THE DRAWINGS

The object and features of the present invention will become more readily apparent from the following detailed description taken in connection with the accompanying drawings in which:

FIG. 1 is a block diagram of a vehicle terminal apparatus according to a first embodiment of this invention;

FIG. 2 is a block diagram of a vehicle terminal apparatus according to a second embodiment of this invention;

FIG. 3 is a block diagram of a vehicle terminal apparatus according to a third embodiment of this invention;

FIG. 5 is a block diagram of a vehicle terminal apparatus according to a fifth embodiment of this invention;

FIG. 13 is a block diagram of a vehicle terminal apparatus with an emergency informing function of the thirteenth embodiment; and FIG. 14 is a block diagram of an emergency informing system including the vehicle terminal apparatus with an emergency data informing function according to the thirteenth embodiment.

The same or corresponding elements or parts are designated with like references throughout the drawings.

DETAILED DESCRIPTION OF THE INVENTION

<First Embodiment>

Figure 4A:
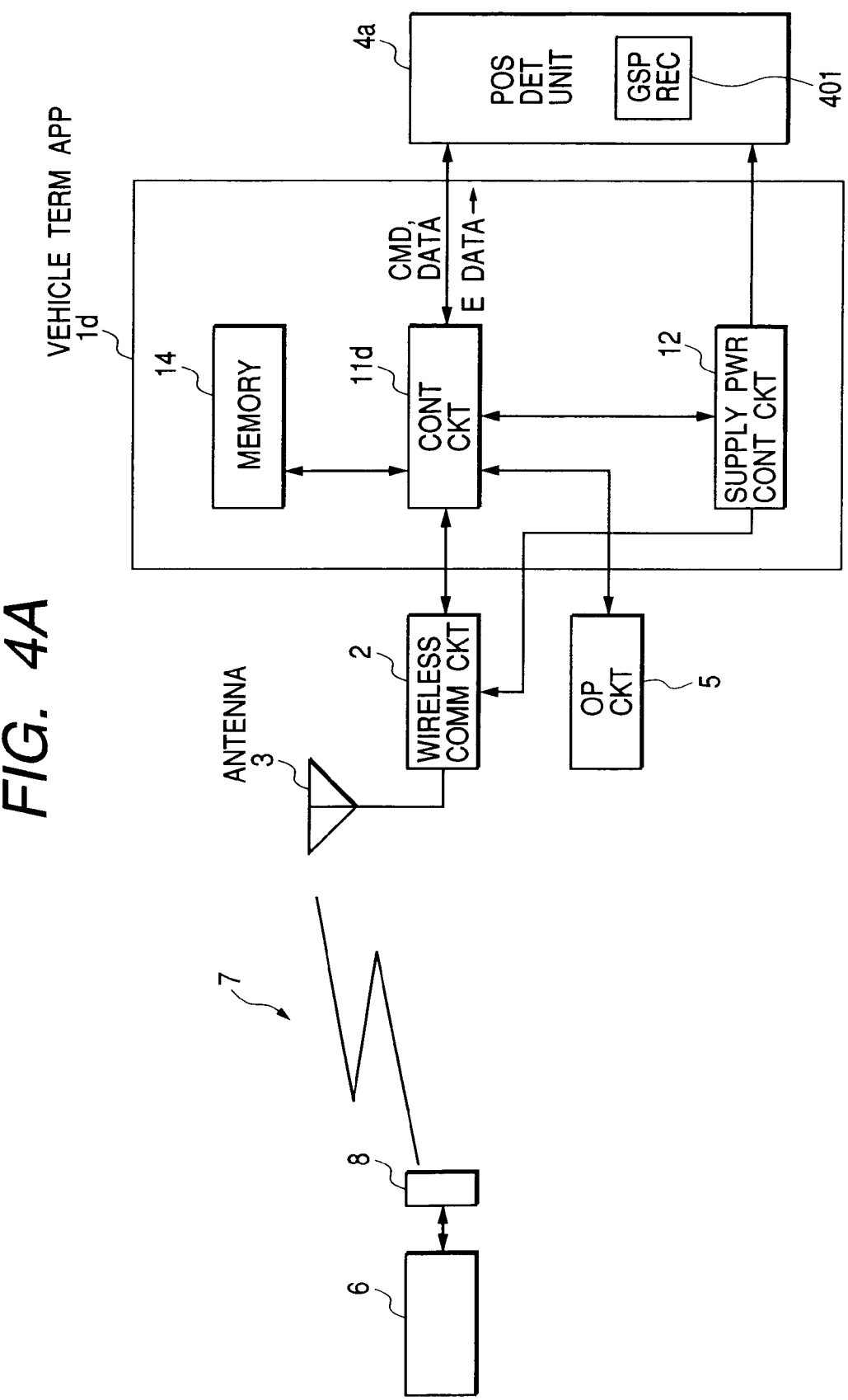
FIG. 4A is a block diagram of a vehicle terminal apparatus according to a fourth embodiment of this invention.

FIG. 1 is a block diagram of a vehicle terminal apparatus 1a for a vehicle according to a first embodiment of this invention.

A vehicle terminal apparatus 1a is mounted on a vehicle and includes a wireless communication circuit 2, an antenna 3, an operation circuit 5, a control circuit 11a, and a supply power control circuit 12. The vehicle terminal apparatus 1a controls supplying a power to at least one of said wireless communication circuit 2 and a unit in said vehicle in response to a command signal. The wireless communication circuit 2 is coupled to a predetermined unit (station) 6 through a wireless network 7 and a base station 8. The wireless communication circuit 2 receives a call from the predetermined unit 6 to establish a link and a communication condition with the predetermined unit 6 and makes a call to the predetermined unit 6 to establish link and a communication condition. In the communication condition, the control circuit 11a transmits data or a voice signal to the predetermined unit 6 and receives data or a voice signal from the predetermined unit 6. The wireless communication circuit 2 may be included in the case of the vehicle terminal apparatus 1a. The supply power control circuit 12 controls supplying the power to a vehicle-mounted unit 4 for the vehicle and to the wireless communication circuit 2. The vehicle-mounted unit 4 is usually provided outside the vehicle terminal apparatus 1a. However, it is also possible that the vehicle-mounted unit 4 is included in the case of the vehicle terminal apparatus 1a. The vehicle-mounted unit 4 communicates with the control circuit 11a to send data to the control circuit 11a and receives data and request commands from the control circuit 11a.

The operation circuit 5 generates an operation signal in response to operation by a user (driver) to supply the operation signal to the control circuit 11a. The vehicle-mounted unit 4 includes a position detection circuit for example. The predetermined unit 6 may be provided in a base station of the wireless communication network or coupled to the base station 8 of the wireless communication network for controlling the vehicle by transmitting data or command signals to the vehicle terminal apparatus 1a and receiving data from the vehicle terminal apparatus 1a.

The control circuit 11a comprises a microprocessor. The control circuit 11a communicates with the predetermined unit 6 and with the vehicle-mounted unit 4 and controls respective circuits in the vehicle terminal apparatus 1. The supply power control circuit 12 cuts off the power to the vehicle-mounted unit 4 if the vehicle-mounted unit 4 is supplied with the power and is not used and supplies the power to the vehicle-mounted unit 4 under control by the control circuit 11a.

More specifically, the control circuit 11a controls the supply power control circuit 12 to cut off the power to the wireless communication circuit 2 and at least one of vehicle-mounted units 4 to save the power consumption in response to a command signal when the vehicle-mounted unit 4 is not used. The command signal is generated by the operation circuit 5 or is received from the predetermined unit 6, or other circuits such as a timer mentioned later. Moreover, the control circuit 11a controls the supply power control circuit 12 to supply the power to the wireless communication circuit 2 or at least one of vehicle-mounted units 4 if necessary.

<Second Embodiment>

FIG. 2 is a block diagram of a vehicle terminal apparatus 1b for a vehicle according to a second embodiment of this invention.

A vehicle terminal apparatus 1b has substantially the same structure as that of the first embodiment. The difference is that a timer 13 is further provided and the control circuit 11b effects the supply power controlling in accordance with the timer 13.

The timer 13 periodically generates a timing signal at a predetermined interval as an interruption signal to the control circuit 11b.

The control circuit 11b periodically operates the supply power control circuit 12 to supply the power to the vehicle-mounted unit 4 or the wireless communication circuit 2 in response to the timing signal from the timer 13. When the control circuit 11b detects that the vehicle-mounted unit 4 or the wireless communication circuit 2 is not used, the control circuit 11b operates the supply power control circuit 12 to stop supplying the power to the vehicle-mounted unit 4 or the wireless communication circuit 2. The timer 13 may generate the timing signal at a predetermined time every day. This is known by the predetermined unit 6, so that the predetermined unit 6 can communicate with the vehicle terminal apparatus 1b and can control the vehicle-mounted unit 4.

<Third Embodiment>

FIG. 3 is a block diagram of a vehicle terminal apparatus 1c for a vehicle according to a third embodiment of this invention.

A vehicle terminal apparatus 1c has substantially the same structure as that of the first embodiment. The difference is that a memory 14 is further provided and the control circuit 11c effects the supply power controlling with the memory 14.

The control circuit 11c controls the supply power control circuit 12 to cut off the power to the wireless communication circuit 2 and at least one of vehicle-mounted units 4 when the circuit is not used to save power consumption in response to a command signal. The command signal is generated by the operation circuit 5 or is received from the predetermined unit, or other circuits such as the timer 13 mentioned in the second embodiment.

When the user effects operation regarding the vehicle-mounted unit 4 with the operation circuit 5, the control circuit 11c receives the operation signal and controls the supply power control circuit 12 to supply the power to the vehicle-mounted unit 4 to activate it. Next, the control circuit 11c communicates with the vehicle-mounted unit 4. If the vehicle-mounted unit 4 includes a position detection circuit, the control circuit 11c sends a position data request command to the vehicle-mounted unit 4. The vehicle-mounted unit 4 detects the position of the vehicle with a GPS, for example, and generates position data to supply it to the control circuit 11c. The control circuit 11c receives the position data and stores the position data in the memory 14.

When the control circuit 11c is requested to transmit the data from the memory 14, the control circuit 11c detects the communication condition of the wireless communication circuit 2. If the wireless communication circuit 2 is in the communication condition, the control circuit 11c reads the position data from the memory 14 and transmits the position data to the predetermined unit 6. If the wireless communication circuit 2 is in a standby condition, the control circuit 5 requests the wireless communication circuit 2 to enter the communication condition. The wireless communication circuit 2 makes a call to the predetermined unit 6 with telephone data from the memory 14 to establish the link and the communication condition. When the communication condition is established, the control circuit 11c transmits the position data to the predetermined unit 6. If the supply power to the wireless communication is not supplied and the transmission command is inputted from the operation circuit 5, the control circuit operates the supply power control circuit 12 to supply the power to the wireless communication circuit 2 to make a call and transmit the position data to the predetermined unit 6.

Moreover, the command signal may be generated by the timer 13. That is, the timer 13 generates the timing signal periodically to activate the vehicle-mounted unit 4 and supplies position data, for example, and the control circuit 11c stores the data in the memory 14. When a data request is received by the control circuit 11c from the predetermined unit 6 or the operation circuit 5. The stored data is transmitted to the predetermined unit 6.

<Fourth Embodiment>

FIG. 4A is a block diagram of a vehicle terminal apparatus 1d for a vehicle according to a fourth embodiment of this invention.

A vehicle terminal apparatus 1d has substantially the same structure as that of the third embodiment. The difference is that as the vehicle-mounted unit 4, a position detection unit 4a is used and the control circuit 11d effects a special operation for position detection.

The position detection circuit 4a includes a GSP receiver 401. The position detection unit 4a requires Ephemeris data including orbit data of GPS satellites. The Ephemeris data can be obtained by receiving it from the GPS satellites. However, because the Ephemeris data is effective for a while once Ephemeris data is received, if the Ephemeris data can be obtained from another unit, the interval necessary for obtain the position data is shortened.

When transmitting position data of the vehicle to the predetermined unit 6 is requested, the driver operates the operation circuit 5 to obtain the position data and transmits the position data to the predetermined unit 6. The control circuit 11d operates the wireless communication circuit 2 to make a call to the predetermined unit 6. When the communication condition has been established, the predetermined unit 6 transmits recent Ephemeris data to the vehicle terminal apparatus 1d. The control circuit 11d of the vehicle terminal apparatus 1d receives the recent Ephemeris data and forwards the recent Ephemeris data to the position detection unit 4a. The position detection unit 4a operates the GPS receiver 401 with the Ephemeris data to calculate the position of the vehicle. When the position detection unit 4a obtains the position data of the vehicle, the position detection unit 4a sends the position data to the control unit 11d. The control unit 11d transmits the position data to the predetermined unit 6. The control circuit 11d stores the Ephemeris data with the time data for a while to detect the position data in the memory 14.

If the driver of the vehicle desires to transmit the position data of the vehicle, the driver operates the operation circuit 5. In response to this, the control circuit 11d searches Ephemeris data in the memory 14 and checks that the stored Ephemeris data is effective, that is, it is not old, the control circuit 11 uses the Ephemeris data read from the memory 14. More specifically, the control circuit 11d checks the interval from the time indicated by the time data stored in the memory 14 and the present time exceeds a predetermined interval. If the stored Ephemeris data is effective, the control circuit 11d sends the read Ephemeris data to the position detection unit 4a. The control circuit 11d obtains the position data from the position detection unit 4a and makes a call to the predetermined unit 6 to establish the communication condition with the predetermined unit 6 and transmit the obtained position data to the predetermined unit 6.

If the Ephemeris data is ineffective, the control circuit 11d requests the predetermined unit 6 to transmit the Ephemeris data. If the predetermined unit 6 transmits new Ephemeris data to the vehicle terminal apparatus 1d, the control circuit 11d receives and transmits the position data as mentioned above. If the control circuit 11d fails to obtain the effective Ephemeris data from the memory 14 or the predetermined unit 6, the control circuit 11d requests the position detection unit 4a to obtain the Ephemeris data with the GPS receiver 401.

As mentioned above, the vehicle terminal apparatus 1d supplies the data necessary for the position detection unit 4a, i.e., the vehicle-mounted unit 4. In this case, the interval necessary for obtaining the Ephemeris data from the predetermined unit or the memory 14 is shorter than that obtained by the GPS receiver 401 by about thirty seconds, so that a power consumption in the car battery is suppressed.

Figure 4B:
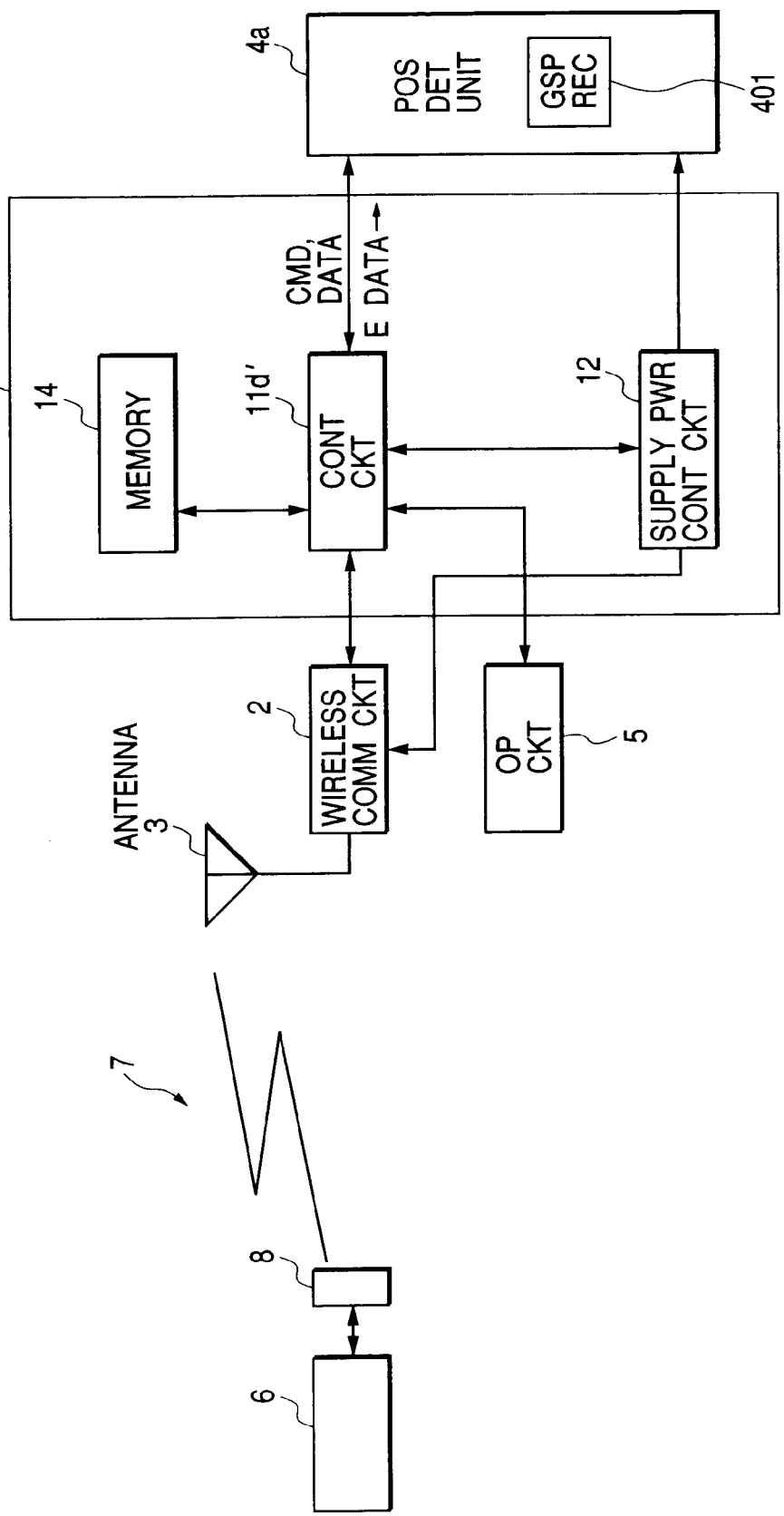
FIG. 4B is a block diagram of a vehicle terminal apparatus according to a modification in the fourth embodiment.

FIG. 4B is a block diagram of a vehicle terminal apparatus 1d' according to a modification in the fourth embodiment. That is, the position detection unit 4a is included in the vehicle terminal apparatus 1d'. The operation of the vehicle terminal apparatus 1d' is the same as the vehicle terminal apparatus 1d'.

<Fifth Embodiment>

FIG. 5 is a block diagram of a vehicle terminal apparatus 1e for a vehicle according to a fifth embodiment of this invention.

A vehicle terminal apparatus 1e has substantially the same structure as that of the first embodiment. The difference is that a data communication monitoring circuit (program) 111 is further provided in a control circuit 11e. The data communication monitoring circuit 111 may be provided outside the control circuit 11e but within the vehicle terminal apparatus 1e.

The data communication monitoring circuit 111 detects the communication condition between the wireless communication circuit 2 and the predetermined unit 6. If the wireless communication circuit 2 is in the non-communication condition, the data communication monitoring circuit 111 informs the control circuit 11e of the non-communication condition. Then, the control circuit 11e operates the supply power control circuit 12 to stop supplying the power to the wireless communication circuit 2 or at least one of the vehicle-mounted units 4 after a predetermined interval has passed. If the data communication monitoring circuit 111 detects the communication condition, the control circuit 11e keeps to supply the power to the wireless communication circuit 2. Moreover, when the data communication monitoring circuit 111 detects completion of the communication, the control circuit 11e stops supplying the power to the wireless communication circuit 2 or at least one of the vehicle-mounted units 4 after a predetermined interval has passed or when the non-communication condition is detected.

As mentioned above, if there is no predetermined event such as receiving or transmission of data or sound data, the control circuit 11e stops supplying the power to the wireless communication circuit 2 or one of the vehicle-mounted units 4 to suppress the power consumption. If data communication or sound data communication is performed, supplying the power is kept.

<Sixth Embodiment>

Figure 6:
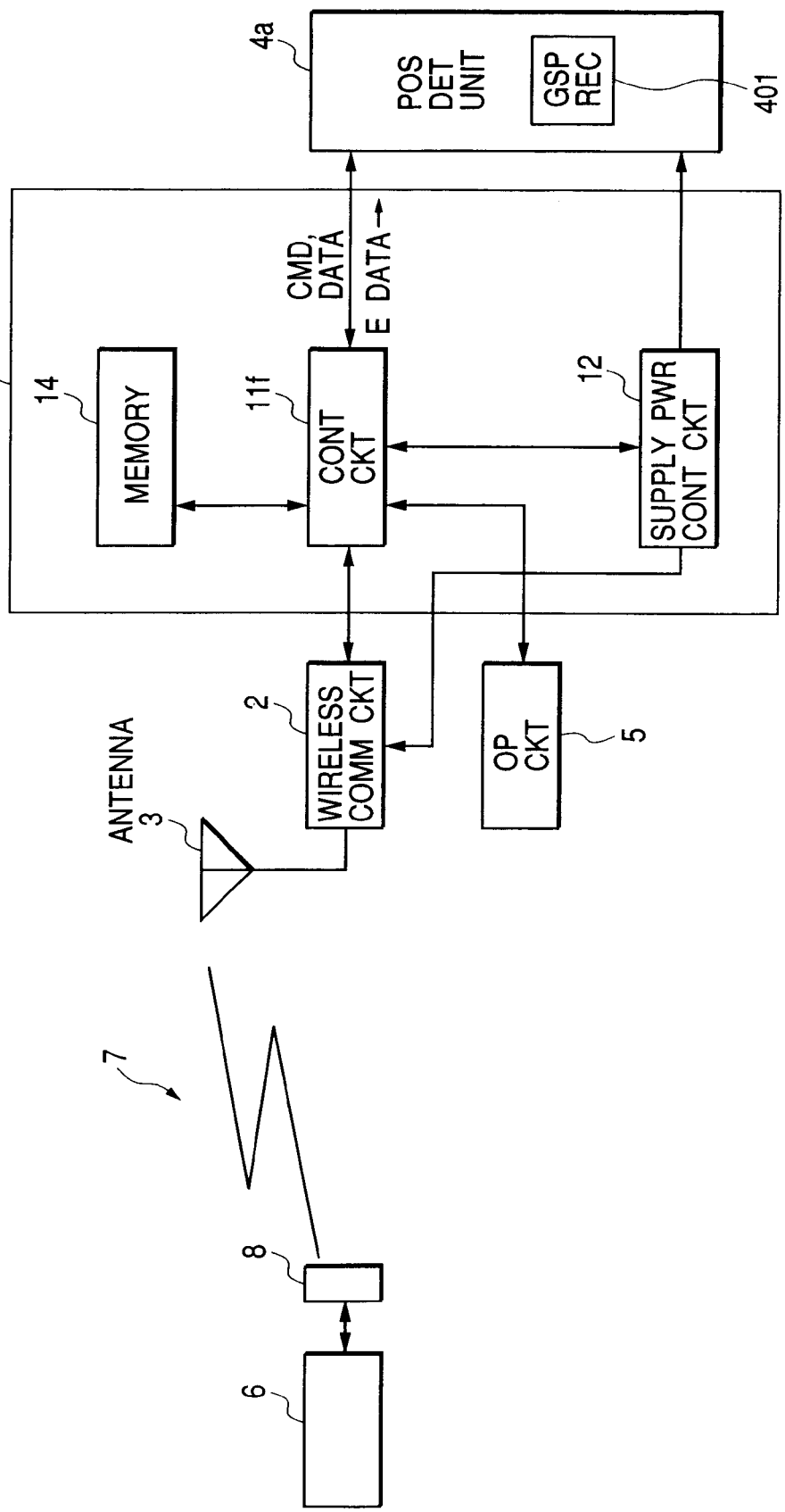
FIG. 6 is a block diagram of a vehicle terminal apparatus according to a sixth embodiment of this invention.

FIG. 6 is a block diagram of a vehicle terminal apparatus 1f for a vehicle according to a sixth embodiment of this invention.

A vehicle terminal apparatus 1f has substantially the same structure as that of the fourth embodiment. The difference is that the predetermined unit 6 transmits a communication request and the position data request and the control circuit 11f receives them.

When the predetermined unit 6 requires position data of the vehicle mounting the vehicle terminal apparatus 1d, the predetermined unit 6 requests the vehicle terminal apparatus 1f to communicate with each other. If the communication condition is established, the predetermined unit 6 transmits a position data request command to the vehicle terminal apparatus 1f. The position data request command may be inputted by the operation circuit 5.

The control circuit 11f of the vehicle terminal apparatus 1f receives the position data request command and the recent Ephemeris data and forwards the position data request command and the recent Ephemeris data to the position detection unit 4a. The position detection unit 4a operates the GPS receiver 401 with the Ephemeris data to calculate the position of the vehicle. When the position detection unit 4a obtains the position data of the vehicle, the position detection unit 4a sends the position data to the control unit 11f. The control circuit 11f stores and accumulates the position data with time data in the memory 14 to accumulate the position data.

If the interval necessary for obtaining the position data should be shortened, the predetermined unit 6 transmits recent Ephemeris data with the position data request command to th vehicle terminal apparatus 1f. The control circuit 11f forwards the Ephemeris data to the position detection unit 4a and stores the Ephemeris data with the time data for a while to detect the position data.

Moreover, the control circuit 11f receives a position data transmission command from the predetermined unit 6 or the operation circuit 5. When the control circuit 11f receives the position data transmission command, the control circuit 11f reads the position data in the memory 14 and transmits the position data to the predetermined unit 6.

As mentioned above, the position detection command is generated by the predetermined unit 6 or the operation circuit 5. In response to the position detection command, the vehicle terminal apparatus 1f supplies the power to the position detection unit 4a and stores the obtained position data in the memory 14 to accumulate the position data, so that the accumulated data can be used by the predetermined unit 6.

If the operation circuit 5 includes a display, the position data may be provided to the driver.

<Seventh Embodiment>

Figure 7:
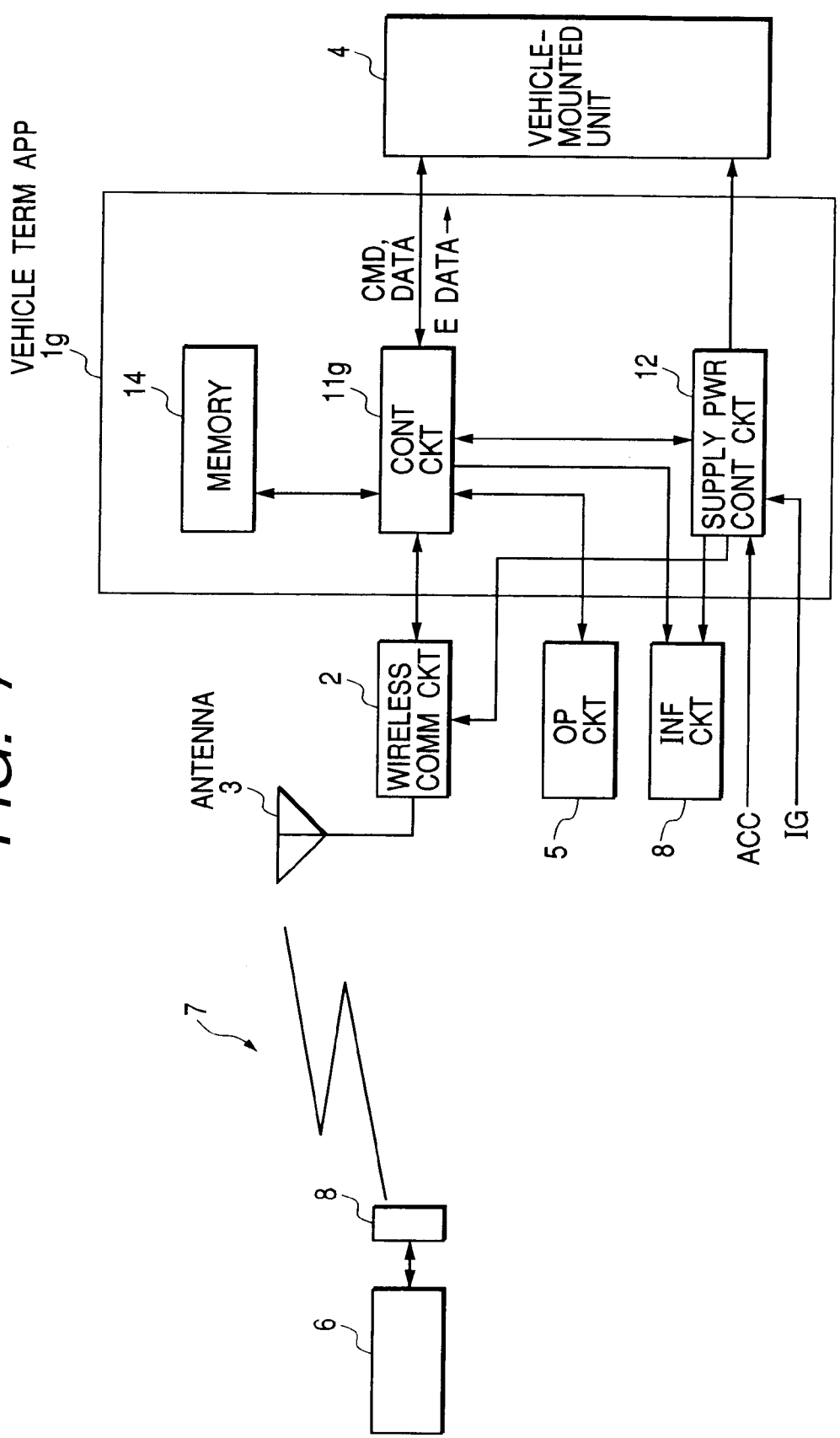
FIG. 7 is a block diagram of a vehicle terminal apparatus according to a seventh embodiment of this invention.

FIG. 7 is a block diagram of a vehicle terminal apparatus 1g for a vehicle according to a seventh embodiment of this invention.

A vehicle terminal apparatus 1g has substantially the same structure as that of the third embodiment. The difference is that the vehicle terminal apparatus 1g further includes an informing circuit 8 to provide data from the predetermined unit 6 or the stored data in the memory 14 to the driver and the supply power control circuit 12 further responds to an accessary power signal indicative of supplying a power to accessary circuits and an ignition signal indicative of start-up the engine from the main switch of the vehicle. The supply power control circuit 12 forwards the accessary power signal ACC and the ignition signal IG to the control circuit 11g.

When the accessary power signal ACC or the ignition signal IG is supplied, the control circuit 11g turns on the information circuit 8 and provides data read from the memory 14 or the data transmitted from the predetermined unit 6 to the driver. That is, when the driver turns the main switch, the accessary power signal or the ignition signal IG is generated. Then, the information circuit 8 provides the data to the driver. The data in the memory 14 may be accumulated as mentioned in the sixth embodiment or may be transmitted from the predetermined unit and stored in the memory 14. The informing circuit 8 provides the data to the driver visually or acoustically for example.

More specifically, when there is necessity that the predetermined unit 6 transmits data to individual vehicle terminal apparatus, the predetermined unit 6 makes a call to the vehicle terminal apparatus 1g to establish the communication condition. Then, the predetermined unit 6 transmits the data to the vehicle terminal apparatus 1g. The control circuit 11g receives the data from the predetermined unit 6 and stores the data in the memory 14. When the driver turns the main switch, the accessary power signal ACC or the ignition signal IG are generated. In response to this, the control circuit 11g reads the data from the memory 14 and generates display data or acoustic data to the informing circuit 8. If the informing circuit 8 comprises a display such as an LCD, the LCD displays the data visually. If the informing circuit 8 comprises a speaker, the speaker generates sound indicative of the data from the memory 14. As mentioned, the data to be provided to the driver is transmitted and stored previously. When the driver gets on the vehicle and turns the main switch, the information circuit 8 is turned on and the data is provided to the user.

<Eighth Embodiment>

Figure 8:
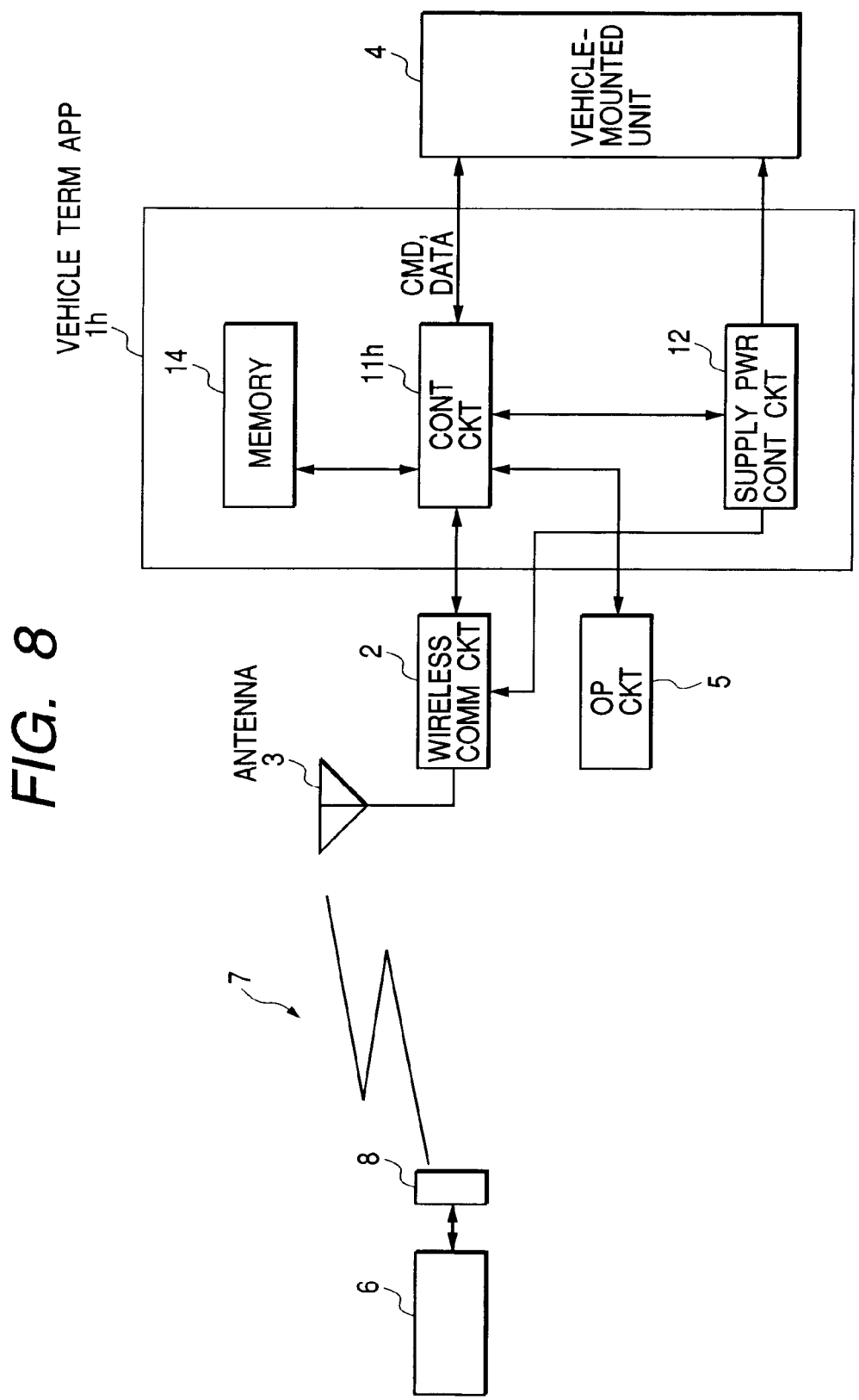
FIG. 8 is a block diagram of a vehicle terminal apparatus according to an eighth embodiment of this invention.

FIG. 8 is a block diagram of a vehicle terminal apparatus 1h for a vehicle according to an eighth embodiment of this invention.

A vehicle terminal apparatus 1h has substantially the same structure as that of the third embodiment. The difference is that the vehicle terminal apparatus 1h only transmits data in response to a data request from the predetermined unit 6. More specifically, the vehicle terminal apparatus 1h transmits data stored in the memory 14 with the wireless communication circuit 2. The data is obtained by supplying the power to the vehicle-mounted unit 4 and stores the data from the vehicle-mounted unit 4 in the memory 14.

If the predetermined unit 6 requires data from the vehicle terminal apparatus 1h, the predetermined unit 6 makes a call to the vehicle terminal apparatus 1h to establish the communication condition. Then, the predetermined unit 6 transmits the data request command to the vehicle terminal apparatus 1h. The control circuit 11h receives the data request command from the predetermined unit 6. The control circuit 11h supplies the power to the vehicle-mounted unit 4 and sends a data request command to the vehicle-mounted unit 4. The vehicle-mounted unit 4 generates or obtains the data as requested. The vehicle-mounted unit 4 sends the data to the control circuit 11h. The control circuit 11h forwards the data from the vehicle-mounted unit 4 to the predetermined unit 6 through the wireless communication circuit 2. Moreover, the control circuit 11h receives the data request from the operation circuit 5. The vehicle-mounted unit 4 may detect the present position, store a registered number of the vehicle, detect a trouble and stores the trouble data and transmit the present position data, a registered number data, or the trouble data to the predetermined unit.

<Ninth Embodiment>

Figure 9:
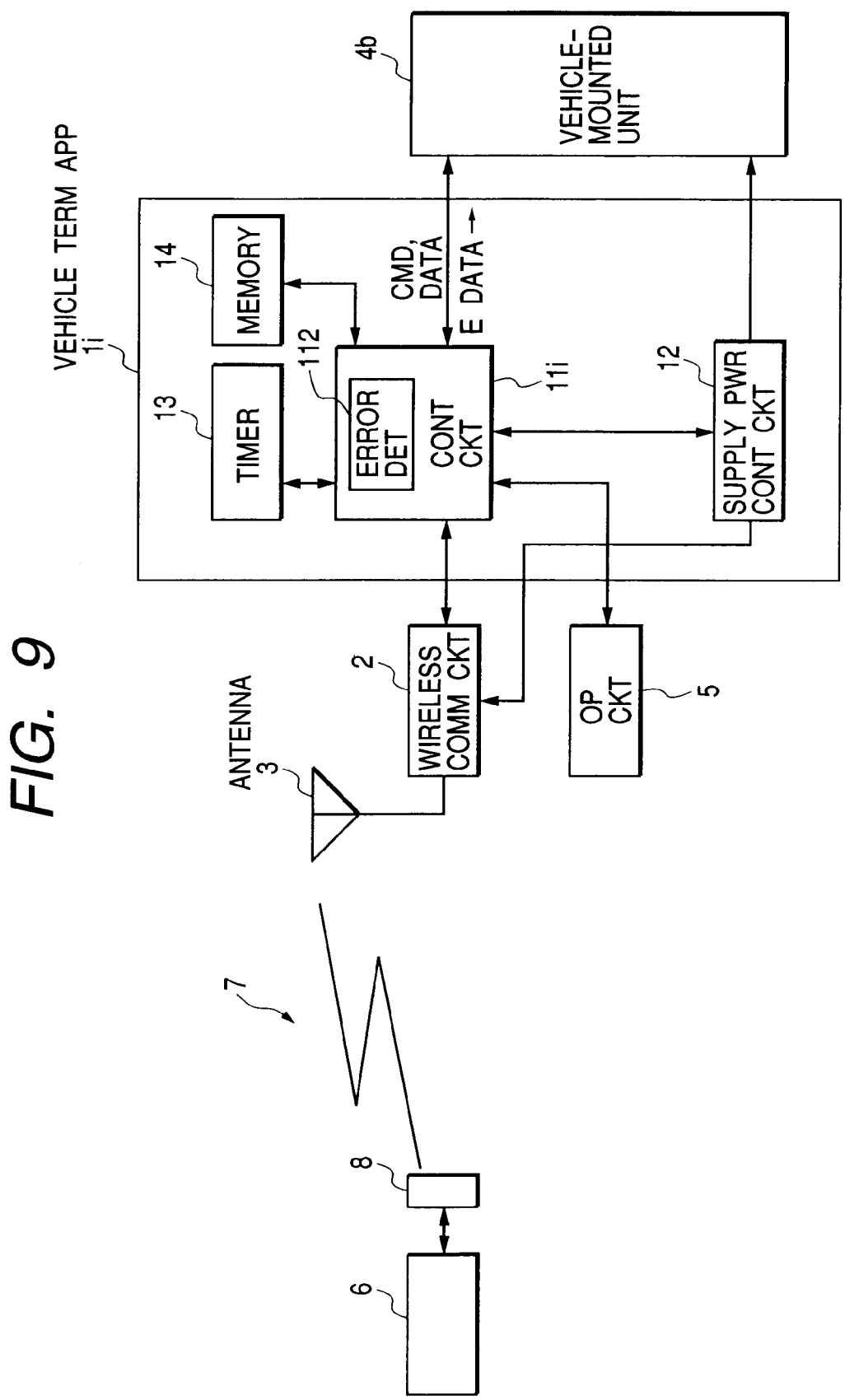
FIG. 9 is a block diagram of a vehicle terminal apparatus according to a ninth embodiment of this invention.

FIG. 9 is a block diagram of a vehicle terminal apparatus 1i for a vehicle according to a ninth embodiment of this invention.

A vehicle terminal apparatus 1i has substantially the same structure as that of the eighth embodiment. The difference is that an error detection circuit 112 and a timer 13 are further provided. The error detection circuit (program) 112 performs a diagnostic operation for the vehicle terminal apparatus 1i.

The control circuit 11i periodically performs the error detection operation with the error detection program 112 in response to the timer 13, a call, or other input to detect the condition of the vehicle terminal apparatus 1i.

Moreover, the control circuit 11i sends an error data request command to the vehicle-mounted unit 4b. The vehicle-mounted unit 4b detects the condition of thereof and sends the condition of the vehicle-mounted unit 4b data to the control circuit 11i.

The control circuit 11i judges the condition of the vehicle terminal apparatus and 4b and if the condition is in an error condition, the control circuit 11*i* stores the error condition in the memory 14. When the control circuit 11*i* detects the communication condition with the predetermined unit 6, the control circuit 11*i* transmits the error data to the predetermined unit 6.

<Tenth Embodiment>

Figure 10:
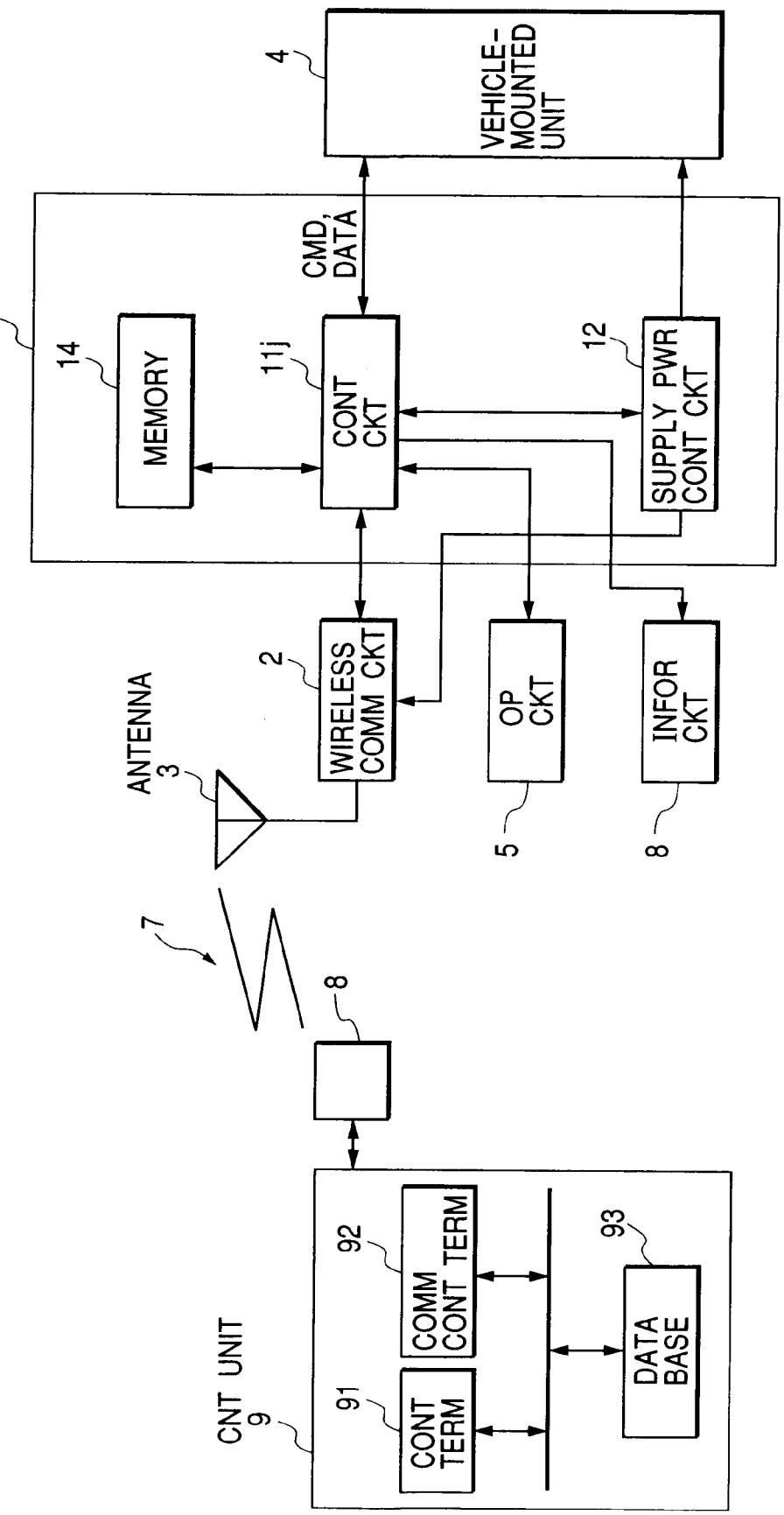
FIG. 10 is a block diagram of an information transmitting system including a vehicle terminal apparatus of a tenth embodiment of this invention.

FIG. 10 is a block diagram of an information transmitting system including a vehicle terminal apparatus 1*j* of a tenth embodiment of this invention.

The information transmitting system includes a center apparatus 9 transmits data from a data base to the vehicle terminal apparatus 1*j* and receives data from the vehicle terminal apparatus 1*j* to store the received data in the data base.

The center apparatus 9 includes a control terminal 91 for inputting a data transmission command and a data request command and for controlling the units in the center unit 9, a communication control terminal 92 for communicating with the vehicle terminal apparatus 1*j*, and a data base 93 for storing data from the control terminal 91 and the communication control terminal 92.

The vehicle terminal apparatus 1*j* has substantially the same structure as that of the vehicle terminal apparatus 1*g* of the seventh embodiment. The difference is that the control circuit 11*j* displays data from the center unit 9.

The data base 93 comprises a hard disc unit and stores individual customer's data and data regarding the vehicles of the customers. If data should be transmitted to individual vehicles, an operator operates the control terminal 91 to generate the data transmission command to transmit data to a specified vehicle or a specified plural vehicles. The control terminal 91 reads a telephone number of the wireless communication circuit 2, and identification number of the vehicle from the data base 93. The control terminal 91 operates the communication control terminal 92 to make a call to the vehicle terminal 1*j* with the read telephone number. When a communication condition has been established, the communication control terminal 92 transmits the read data to the vehicle terminal apparatus 1*j*. The control circuit 11*j* receives the data and stores the data in the memory 14.

When the control circuit 11*j* detects operation of the operation circuit 5, the control circuit 11*j* reads the data from the memory 14 and supplies the data to the informing circuit 8 to inform the data to the driver. The informing circuit 8 informs the data to the driver with visual information or acoustic information, so that the data read from the data base 93 is supplied to the driver.

Moreover, if the center unit 9 requires data of the vehicle, the operator operates the control terminal 91 to transmit a data request to the vehicle terminal apparatus 1*j* using the communication control terminal 92. The control circuit 11*j* receives the data request from the center unit 9. Then, the control circuit 11 obtains the requested data from the memory 14. If the requested data may be obtained from the vehicle-mounted unit 4, the control circuit 11*j* operates the supply power control circuit 12 to supply the power to the vehicle-mounted unit 4 and sends a data request command to the vehicle-mounted unit 4. In response to this, the vehicle-mounted unit 4 obtains the requested data, for example, position data, and supplies the requested data to the control circuit 11*j*. The control circuit 11*j* receives the data from the memory 14 or the vehicle-mounted unit 4 and transmits the data with its own identification number to the center unit 9. The communication control terminal 92 receives the data from the vehicle terminal apparatus 1*j*. The control terminal 91 stores the received data in the data base 93 with respect to the identification number of the vehicle. The control terminal 91 may further provides the received data to the operator with a display provided to the control terminal 91.

<Eleventh Embodiment>

Figure 11:
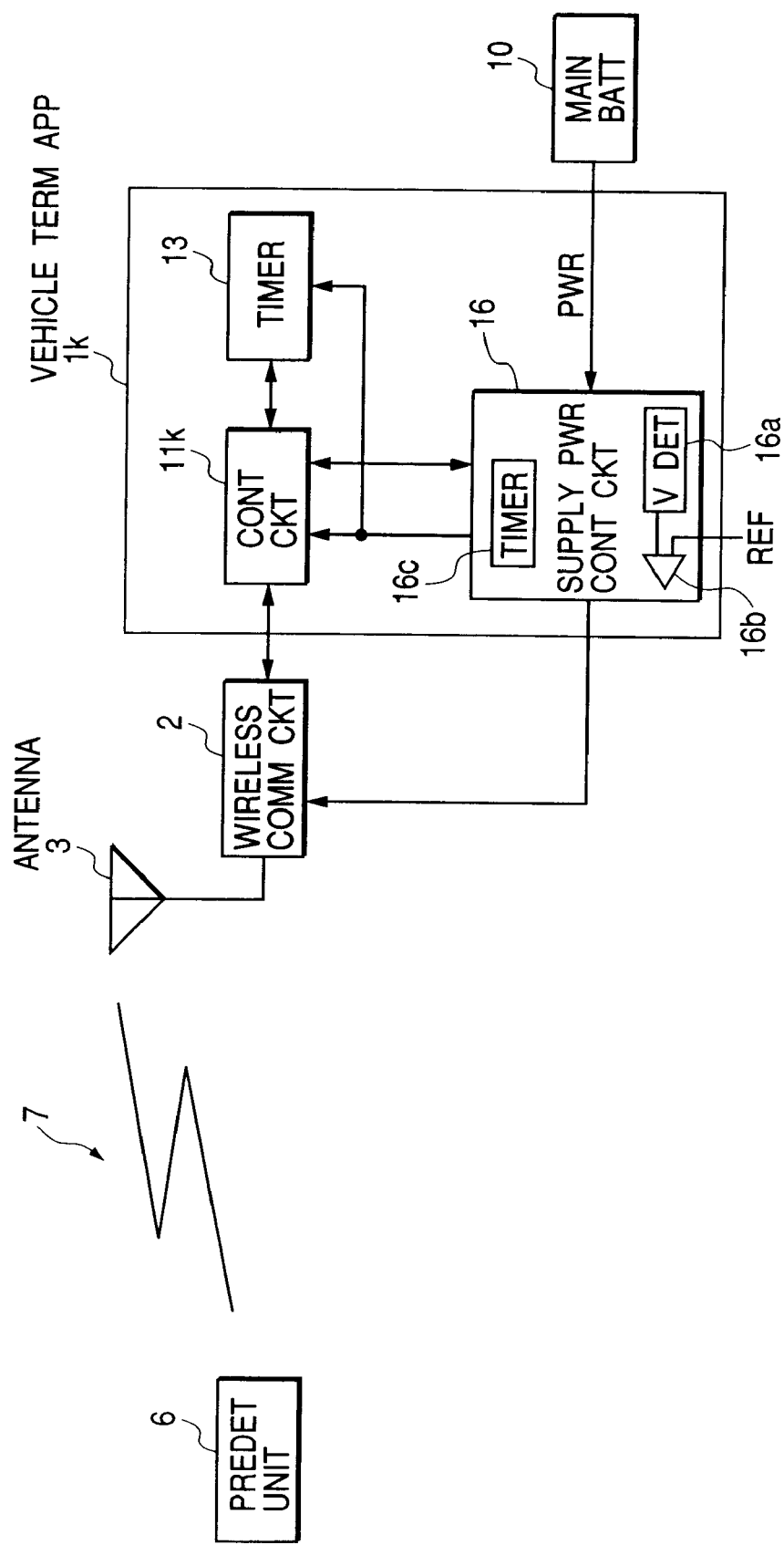
FIG. 11 is a block diagram of vehicle terminal apparatus of an eleventh embodiment.

FIG. 11 is a block diagram of vehicle terminal apparatus 1*k* of an eleventh embodiment.

A vehicle terminal apparatus 1*k* is mounted on a vehicle includes a wireless communication circuit 2, an antenna 3, a control circuit 11*k*, and a supply power control circuit 16. The vehicle terminal apparatus 1*k* controls supplying a power to at least one of said wireless communication circuit 2 and the circuits in said vehicle in response to a command signal. The wireless communication circuit 2 is coupled to a predetermined unit (station) 6 through a wireless network 8 and a base station 7. The wireless communication circuit 2 receives a call from the predetermined unit 6 to establish link and a communication condition with the predetermined unit 6 and makes a call to the predetermined unit 6 to establish link and communication condition. In the communication condition, the control circuit 11*k* transmits data or a voice signal to the predetermined unit 6 and receives data or a voice signal from the predetermined unit 6. The wireless communication circuit 2 may be included in the case of the vehicle terminal apparatus 1*a*. The supply power control circuit 12 controls supplying the power to the circuits in the vehicle terminal apparatus 1*k*. Moreover, the supply power control circuit 16 may supply the power to a unit in the vehicle.

The supply power control circuit 16 includes a power supplying circuit and a voltage detection circuit 16*a* and a comparator 16*b*. The voltage detection circuit 16*a* detects a voltage of the power from the main battery 10. The comparator 16*b* compares the voltage of the power with a reference. If an error condition of the main battery 10 is detected, the supply power control circuit 16 informs the control circuit 11*k* of the error condition. For example, when the voltage is less than the reference, the supply power control circuit 16 informs the control circuit 11*k* of the error condition. Moreover, the supply power control circuit 16 may detect the error of the main battery 10 and a degree of used charge of the main battery 10. The supply power control circuit 16 may further include a timer 16*c* and detect the low voltage condition over a predetermined interval using the timer 16*c*. Moreover, the vehicle terminal apparatus 1*k* may further includes a backup battery (not shown) and the supply power control circuit 16 supplies the power from the backup battery when the voltage of the main battery 10 is less than the reference. Moreover, the voltage detection of the main battery 10 is effected in response to timer 16*c* to suppress the power consumption. Further, the supply power control circuit 16 may detect the remaining charge of the main battery 10 or the backup battery by detecting a voltage decrease when a predetermined load is connected to the main battery 10 or the backup battery. Thus, the supply power control circuit 16 may detect other error conditions such as such as a low remaining charge condition and an open circuit condition of the main battery 10.

The control circuit 11*k* makes a call to the predetermined unit and transmits data of the error condition of the main battery 10 to the predetermined unit 6 when the error occurs.

<Twelfth Embodiment>

Figure 12:
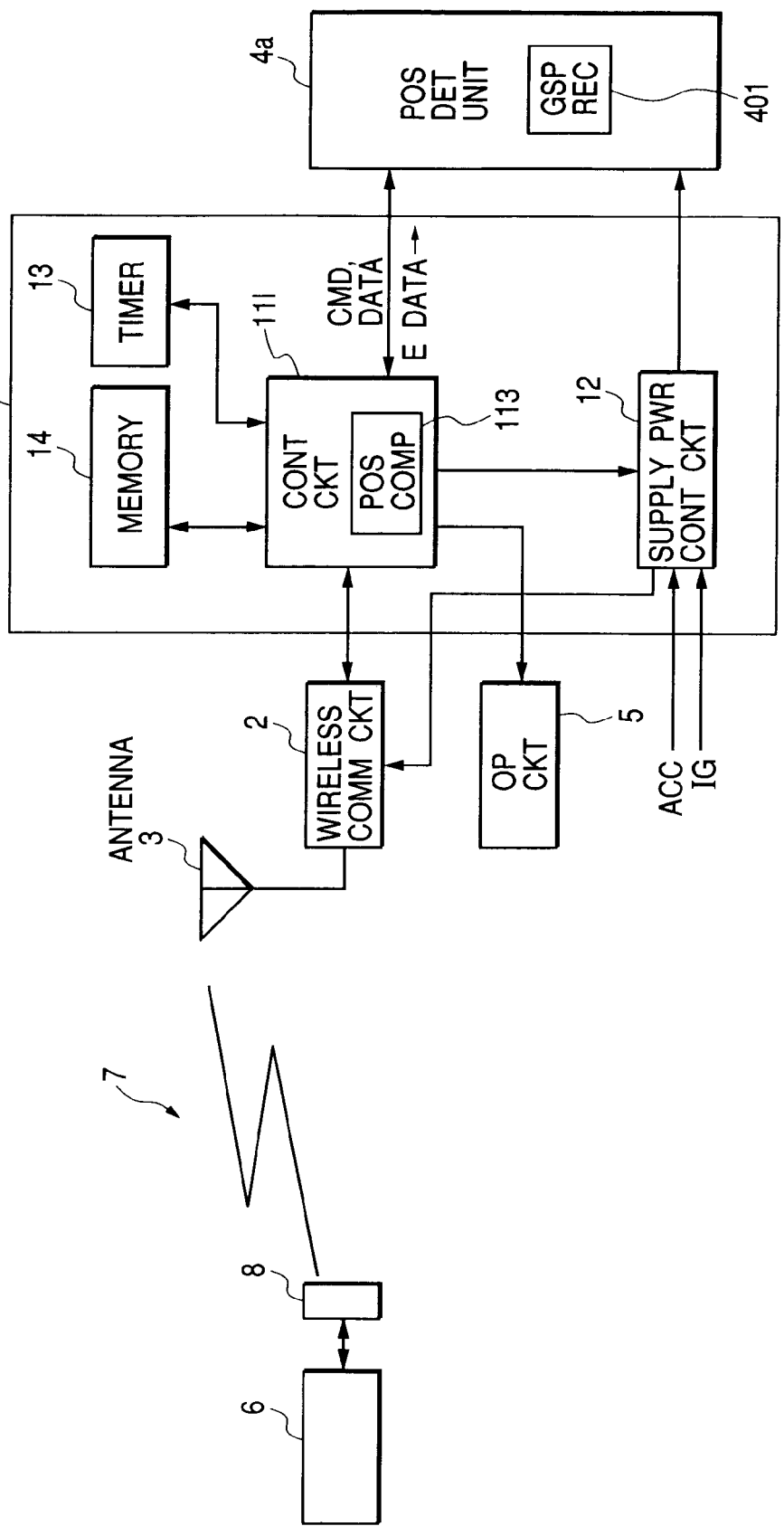
FIG. 12 is a block diagram of a vehicle terminal apparatus according to a twelfth embodiment of this invention.

FIG. 12 is a block diagram of a vehicle terminal apparatus 1*l* for a vehicle according to a twelfth embodiment of this invention.

A vehicle terminal apparatus 1*l* has substantially the same structure as that of the fourth embodiment. The difference is that a timer 13 is further provided and the control circuit 11*l* includes a position comparing circuit 113. The timer 13 periodically generates a timing signal supplied to a timer interruption input of the control circuit 11*l*. In response to this, the control circuit 11*l* operates the supply power control circuit 12 to supply the power to the position detection unit 4*a* and sends a position data request to the position detection unit 4*a*. The position detection unit 4*a* obtains the present position data and supplies the present position data to the control circuit 11*l*. The control circuit 11*l* stores the present position in the memory 14.

In response to the next timer interruption, the control circuit 11*l* operates the supply power control circuit 12 to supply the power to the position detection unit 4*a* and sends the position data request to the position detection unit 4*a*. The position detection unit 4*a* obtains the present position data and supplies the present position data to the control circuit 11*l*. The control circuit 11*l* reads the previously stored position data, operates the difference between the present position and the previous position, and compares with the present position. Moreover, the control circuit 11*l* is responsive to the accessary power signal ACC and the ignition signal IG through the supply power control circuit 12.

If the difference between the present position and the previous position is greater than a reference value and there is no accessary power signal ACC and the ignition signal IG between the previous timing signal and the present timing signal, the control circuit 11*l* judges that it is a position error condition. Then, the control circuit 11*l* operates the wireless communication circuit 2 and makes a call to the predetermined unit 6 and transmits the alarming condition data to the predetermined unit 6 to inform the position error condition.

<Thirteenth Embodiment>

FIG. 13 is a block diagram of a vehicle terminal apparatus 201 with an emergency informing function according to a thirteenth embodiment.

The vehicle terminal apparatus 201 includes an emergency switch 203 for informing a predetermined station of an emergency condition, a GPS antenna 204 for receiving a GPS signal, a control circuit (microprocessor) 212 for controlling respective circuits in the vehicle terminal apparatus 201, a wireless communication circuit 211 for controlling communication with a remote unit in a predetermined station such as a police through an antenna 202 via a wireless communication network including a base station (not shown in FIG. 13) under controlling by the control circuit 212, a gyrocompass 213 for detecting a compass direction of the vehicle, a GPS receiver 216 for receiving the GPS signal to calculate its position, a position data detection circuit 214 for detecting position data from the GPS receiver 216 and the GPS antenna 204, a memory 215 for storing data indicating occurrence of emergency, a registered number of the vehicle (identification data of the vehicle), called party data such as a telephone number of police, and the name data of the owner of the vehicle, and a power supply control circuit 212 for controlling a supplying power to the vehicle terminal apparatus 201.

The vehicle terminal apparatus 201 mounted on a vehicle is used for informing a request for a patrol car, a rescue (an ambulance car), a fire engine truck on a motorcar accident, a sudden illness or the like. When a motorcar accident or a sudden illness occurs, the driver depresses the emergency switch 203. In response to this, the vehicle terminal apparatus 201 automatically makes a call to a predetermined station such as a police or an emergency information center or the like and transmits data indicating occurrence of (kinds of) emergency, the present position of the vehicle, data of the registered vehicle.

The control circuit 212 recognizes occurrence of emergency in response to the emergency switch 203. Then, the control circuit 212 supplies a position information demanding signal to the position data detecting circuit 214 and reads called party data, i.e., a telephone number of a police station, etc., identification data of this vehicle and the data of the owner of this vehicle from the memory 215. The control circuit 212 generates emergency data including data indicating occurrence of emergency, the present position data, and the identification data of this vehicle to supply the emergency data to the wireless communication circuit 211.

The wireless communication circuit 211 makes a call to the unit in the predetermined station and when the unit in the predetermined station responds the call, the wireless communication circuit 211 transmits the emergency data via the antenna 202 through a near base station to a wireless telephone network and through a public switched telephone network.

In response to the emergency switch 203, the control circuit 212 operates the supply power control circuit 12 to supply the power to the gyrocompass 213 and the GSP receiver 216 to detect the present position.

Moreover, the supply power control circuit 12 may periodically detect the voltage of the main battery as described in the eleventh embodiment and transmits the error in the main battery to the predetermined unit. In this case, the emergency data is forwarded to the predetermined station by the predetermined unit.

The control circuit 212 controls the supply power control circuit 12 to the unit 4 in response to the command signal from the unit 6 in the predetermined station through the wireless communication circuit 211 or from the operation circuit 5 and controls supplying the supply power to the GPS receiver 216 in response to the emergency switch 203. The controlling of supplying the power to the GSP receiver may be omitted. Particularly, if the gyrocompass should hold the compass direction data, the supplying the power is kept.

FIG. 14 is a block diagram of an (emergency) information transmitting system including the vehicle terminal apparatus 201 just mentioned.

The emergency informing system further includes a wireless communication network 7 and a predetermined unit 6. The predetermined unit 6 may be provided at a police station or the like or the predetermined unit 6 may forward the emergency data to a police station through the PSTN network.

When a motorcar accident or a sudden illness occurs, the driver depresses the emergency switch 203. In response to this, the vehicle terminal apparatus 201 automatically makes a call to the predetermined unit 6 in the station such as a police or an emergency information center or the like and transmits emergency data indicating occurrence of (kinds of) emergency, the present position of the vehicle, data of the registered vehicle through the wireless communication network 7. The predetermined unit 6 receives the emergency data and provides the emergency data such as the identification number of the vehicle, the position, the telephone number or the like to the operator.

The operation according to the twelfth embodiment is applicable to this embodiment. That is, the position detection operation is provided by the position data detection circuit 214 instead the position detection unit 4*a*. The control circuit 212 compares the previous position data with the present position data and informs of the unit 6 of the error in the position data as mentioned above.

What is claimed is:

1. A vehicle comprising:

a terminal apparatus in communication with a wireless communication circuit for effecting wireless communication with a network, said terminal apparatus including a process controller and a supply power controller, and an unit in said vehicle but separate from said terminal apparatus in communication with said process controller and said supply power controller, data being exchanged between said process controller and said unit, and said supply power controller controllably supplying power to said wireless communication circuit and said unit, said supply power controller cutting off power to said wireless communication circuit and said unit in response to a command signal, and a timer for periodically outputting said command signal to said supply power controller.

* * * * *